United States Patent [19]

Wakabayashi et al.

[11] 4,370,577
[45] Jan. 25, 1983

[54] LINEAR MOTOR

[75] Inventors: Noriaki Wakabayashi; Terumichi Fukumoto, both of Hirakata; Nobuhiro Ueda, Neyagawa, all of Japan

[73] Assignee: Matsushita Electric Industrial Co., Ltd., Osaka, Japan

[21] Appl. No.: 284,564

[22] Filed: Jul. 17, 1981

[30] Foreign Application Priority Data

Jul. 22, 1980 [JP] Japan .................................. 55-100691

[51] Int. Cl.³ ............................................. H02K 41/00
[52] U.S. Cl. ..................................................... 310/12
[58] Field of Search .................................. 310/12-19; 318/135

[56] References Cited

U.S. PATENT DOCUMENTS 3,999,107  12/1976  Reuting ............................. 310/12 X
4,259,602   3/1981  Kuribayashi et al. ................. 310/12

OTHER PUBLICATIONS

"Linear Incremental Motor", *IBM Tech. Disclosure Bulletin,* vol. 6, No. 9, 2/1964.

*Primary Examiner*—Donovan F. Duggan
*Attorney, Agent, or Firm*—Wenderoth, Lind & Ponack

[57] ABSTRACT

A linear motor of which is mover and its stator have magnetic teeth and is arranged such that the mover can move linearly on the stator while maintaining a constant gap with respect to the stator. The motor has a permanent magnet which is long in the longitudinal direction of the stator and two cores which are stacked perpendicularly to the longitudinal direction of the stator with said permanent magnet between them. A plurality of coils, each of which is wound over the two cores and the permanent magnet and has a magnetization axis which is perpendicular to the longitudinal direction of the stator. Each of the two cores has n groups (wherein n is an integer) of magnetic teeth facing the stator and each of the n group of magnetic teeth is arranged such that the pitch of a tooth is constant and is the same as that of the magnetic teeth of the stator but the phases of the magnetic teeth of each group are different from each other.

1 Claim, 8 Drawing Figures

LINEAR MOTOR

BACKGROUND OF THE INVENTION

This invention relates to a linear motor of which its mover and its stator have magnetic teeth and is arranged such that the mover can move linearly on the stator while maintaining a constant gap with respect to the stator.

The main elements which contribute to the generation of driving force of this motor are: in the stator, many tooth-shaped bits of magnetic material (hereinafter called magnetic teeth) which are arranged along the longitudinal direction of the stator with a constant pitch, and in the mover, one or more permanent magnets, coils which are wound over cores sandwiching those permanent magnets, and groups of magnetic teeth formed on those cores. As mentioned above, this motor has magnetic teeth on the stator and on the mover; a permanent magnet, and an electromagnet, so that it is a "Hybrid Type" of motor as it is called. More particularly, motors whose stators have only magnetic teeth and whose movers have permanent magnets and the electromagnets with magnetic teeth, are known as examples of "SAWYER TYPE" linear stepping motors.

FIGS. 1a–1c show the principle of these known linear motors, and especially FIG. 1a shows the most fundamental example. A stator 1 is shown as having many magnetic teeth 2 which are arranged along the stator with a constant pitch. A mover 3 is shown as consisting of a permanent magnet 4, four groups of magnetic teeth 5, 6, 7, 8, cores 9, 9, and four separate four phase coils 10, 11, 12, 13 wound around cores 9, 9. However, each phase of the four groups of magnetic teeth 5, 6, 7, and 8 is different by 90 degrees from the other phases. FIG. 1b shows a more concrete example of FIG. 1a and in this figure, the mover is made smaller by replacing the four phase coils by two phase coils. Two phase coils 14 and 15 are shown in FIG. 1b. FIG. 1c shows the three phase model of the motor shown in FIG. 1a. In this example, three groups of magnetic teeth 16, 17, and 18 of the mover are shown and the phase of each tooth group is different by 120 degrees from the other phases. Three phase coils 19, 20 and 21 are also shown. In the above-noted conventional examples shown in FIG. 1a, 1b and 1c, it is normal for the mover 3 to progress in the longitudinal direction of the stator 1 by activating each coil in turn. The explanation of the fundamental principles of these motors is known to those skilled in the art, and is therefore omitted.

SUMMARY OF THE INVENTION

In a linear motor according to this invention, components which are concerned with the generation of a driving force resemble the above-noted examples but have a feature that allows a smaller body and a higher power driving force to be easily realized compared to conventional examples by using a new type magnetic circuit and structure. That is to say, in this invention, if the dimension of the motor is compared to the conventional examples shown in FIGS. 1a–1c, a bigger permanent magnet can be used so the weight ratio of the permanent magnet to the mover can be raised, and accordingly, the driving force can be strong and the ratio of the driving force to the total weight can be improved.

As for the multiplication of the phase of the electromagnet of the mover, in the case of a conventional example (FIG. 1c, etc.) the mover is inclined to be long in the longitudinal direction of the stator, but in the case of this invention, the mover will not be so long but be compact and light. More particularly, if the mover is short in the longitudinal direction of the stator, the movable length will become long.

BRIEF DESCRIPTION OF THE DRAWINGS

Hereinafter, an embodiment of this invention will be described in greater detail with the aid of the accompanying drawings in which:

FIGS. 2a–4 show an embodiment of a linear motor of this invention.

FIGS. 2a and 2b respectively show the oblique view and a cross sectional view perpendicular to the moving direction of the mover;

FIG. 3 shows two different cross sections parallel to the moving direction of the mover;

FIG. 4 shows a chart used for the explanation of FIGS. 2a–2b and 3;

DESCRIPTION OF THE PREFERRED EMBODIMENTS

Figure 2A:
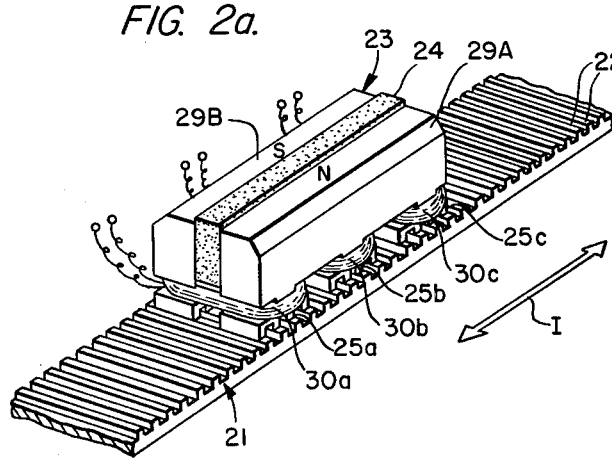
Figure 2B:
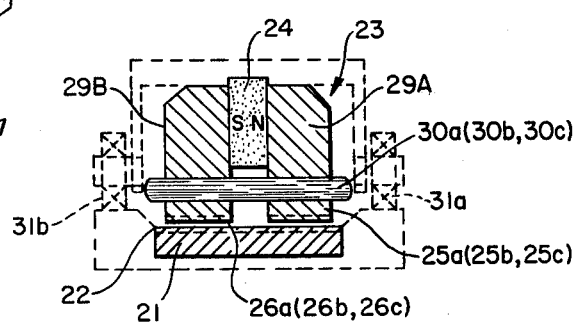
Figure 3:
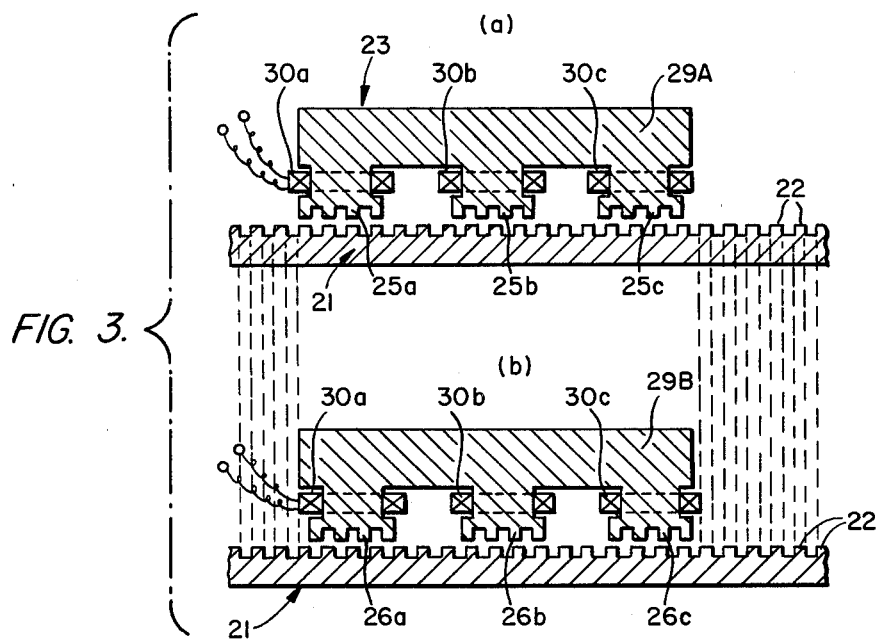

FIGS. 2a–2b and 3 show an embodiment of a linear motor of this invention. FIG. 2a is an oblique view and FIG. 2b is a cross-sectional view perpendicular to the moving direction of the mover, i.e.-the longitudinal direction of the stator, as denoted by an arrow I. FIG. 3(a) and (b) are cross-sections of two different surfaces parallel to the longitudinal direction of the stator. A stator 21 is shown to have many magnetic teeth 22 formed with a constant pitch in the longitudinal direction of the stator. A mover 23, which is composed of a permanent magnet 24 which is long in the longitudinal direction of the stator, has its magnetizing axis perpendicular to that direction; two cores, 29A and 29B sandwich the permanent magnet 24; three separate three phase coils 30a, 30b, and 30c are wound over the two cores 29A and 29B, three groups of magnetic teeth 25a, 25b, and 25c are formed on the stator side surface of the core 29A, and three groups of magnetic teeth 26a, 26b, and 26c are formed on the stator side surface of the core 29B. A narrow gap must be maintained between the stator 21 and the mover 23. For that purpose, the guiding means 31a and 31b are provided, which maintain the air gap and guide the mover 23 toward the longitudinal direction (denoted by an arrow I) of the stator 21; the guiding means 31a and 31b may be rollers, but for the simplification of the figures, they have been omitted from the drawings, except for FIG. 2b. In this example, many magnetic teeth 22, which are formed on the stator 21, are arranged in the longitudinal direction of the stator with a constant pitch, but the magnetic teeth formed on the cores 29A and 29B of the mover are in three groups in each core, that is, six groups in all. The pitch of the magnetic teeth in a group is the same as that of the magnetic teeth 22 of the stator 21, but the phase of magnetic teeth in each group is made different from the other groups.

FIGS. 3(a), (b) are cross-sections which are parallel to the longitudinal direction of the stator, as mentioned above. FIG. 3(a) is the cross-section of the core 29A, and FIG. 3(b) is a cross-section of the core 29B. From these two cross-sections, it is easy to understand that each phase of the groups of magnetic teeth 25a, 25b, and 25c of the core 29A differ by 120 degrees from the other phases, and each phase of the groups of magnetic teeth 26a, 26b, and 26c of the core 29B also differ by 120 degrees from the other phases. The phases of the groups of magnetic teeth of core 29A and 29B differ by 180 degrees from each other. That is to say, the groups of magnetic teeth 25a and 26a, 25b and 26b, 25c and 26c are magnetic teeth having phases which differ by 180 degrees from each other. Coils 30a, 30b, 30c are all wound over cores 29A and 29B.

The mover 23 can be moved in steps in the longitudinal direction of the stator 21 by exciting the three separate three phase coils in order. The mover can be moved more smoothly by applying to the coils a three phase sinusoidal current of which each phase differs by 120 degrees from the other phases and the motion of the ordinary linear motor is possible by switching those currents by signals from a position detector.

Figure 1A:
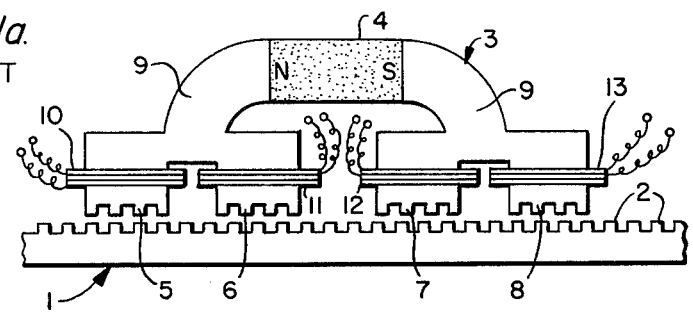
FIGS. 1a–1c show the principle configurations of conventional linear motors.
Figure 1B:
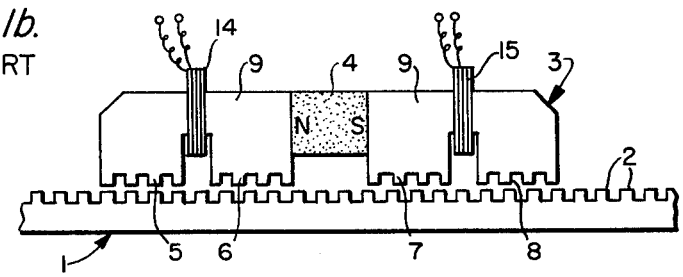
Figure 1C:
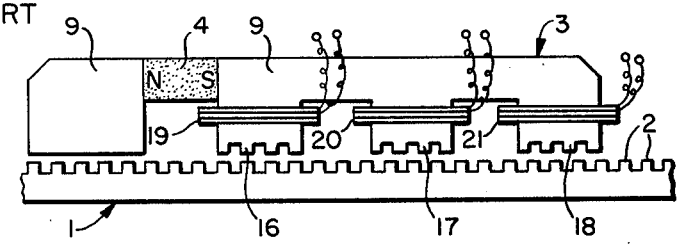

As is known from the description of the embodiment of this invention, shown in FIGS. 2a-2b and 3, the permanent magnet of the mover is constructed so as to be parallel to the longitudinal direction of the stator, so that the volume of the permanent magnet can be larger when compared to the conventional examples shown in FIGS. 1a-1c. The weight ratio of the permanent magnet to the mover can be considerably larger, so that the driving force can be raised. In this example, a three phase motor is shown but the mover length can be shortened when compared to the conventional example shown in FIG. 1c, so that this invention is also advantageous for multi-phase systems.

Next, we will describe the magnetic circuit and the principle of the generation of driving force of the embodiment shown in FIGS. 2 and 3.

Figure 4:
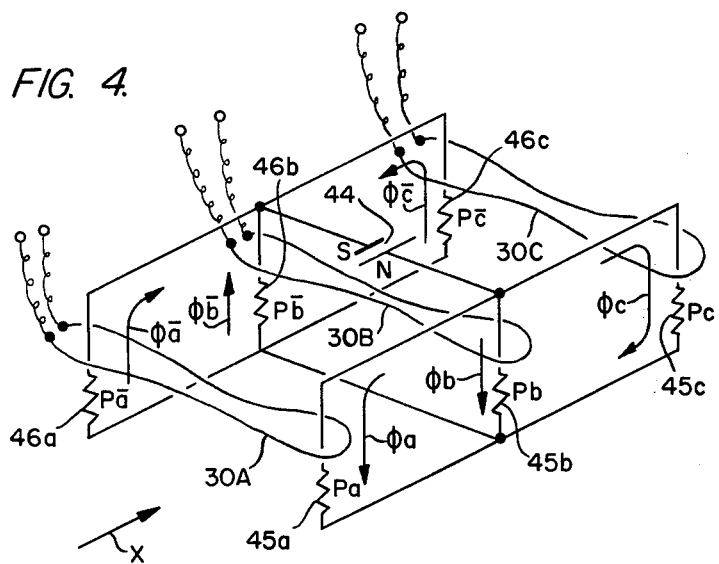

FIG. 4 shows the electric model of the embodiment of this invention for explanation of the magnetic circuit. In FIG. 4, element 44 is an expression of the permanent magnet 24 as a battery, and the permeances 45a, 45b, 45c, 46a, 46b, 46c express gap permeances between the groups of magnetic teeth 25a, 25b, 25c, 26a, 26b, and 26c of the mover and the magnetic teeth 22 of the stator 21, respectively. However, it is assumed that the magnetic registances of the cores 29A, 29B and the stator 21 are zero. Elements 30A, 30B, and 30C express three separate three phase coils 30a, 30b, 30c as a model.

Assuming that the gap permeances between the magnetic teeth of the stator and the groups of magnetic teeth of the mover vary sinusoidally in the direction of the mover movement, and that X is the direction of movement of the mover, L is the pitch of the magnetic teeth, and $P_o$ is the average value of each permeance. The permeances 45a, 45b, 45c, 46a, 46b, and 46c are denoted by $P_a$, $P_b$, $P_c$, $\bar{P}_a$, $\bar{P}_b$, $\bar{P}_c$, respectively, and can be approximated as follows:

$$P_a = P_o + p \cdot \sin \frac{2\pi}{L} X$$

$$P_b = P_o + p \cdot \sin \left( \frac{2\pi}{L} X - \frac{2\pi}{3} \right)$$

$$P_c = P_o + p \cdot \sin \left( \frac{2\pi}{L} X - \frac{4\pi}{3} \right)$$

-continued $$\bar{P}_a = P_o - p \cdot \sin \frac{2\pi}{L} X$$

$$\bar{P}_b = P_o - p \cdot \sin \left( \frac{2\pi}{L} X - \frac{2\pi}{3} \right)$$

$$\bar{P}_c = P_o - p \cdot \sin \left( \frac{2\pi}{L} X - \frac{4\pi}{3} \right)$$

wherein p denotes the amplitude of the variation of the permeances.

Since $P_a + P_b + P_c = 3P_o$, and $P_{\bar{a}} + P_{\bar{b}} + P_{\bar{c}} = 3P_o$, it is reasonable to assume that the total permeance of the magnetic circuit including the permanent magnet is a constant value $((3/2)P_o)$ and is independent of X. It is also reasonable to assume that the magnetic potential difference between the mover side edge and the stator side edge of each permeance is constant and independent of X. Let the magnetomotive force of the permanent magnet be F, then the magnetic potential difference between the mover side edge and the stator side edge of each permeance will be F/2. Accordingly, the magnetic flux $\phi_a$, $\phi_b$, $\phi_c$, $\phi_{\bar{a}}$, $\phi_{\bar{b}}$, $\phi_{\bar{c}}$ which flow in the permeances $P_a$, $P_b$, $P_c$, $P_{\bar{a}}$, $P_{\bar{b}}$, $P_{\bar{c}}$, respectively, can be approximated as follows:

$$\phi_a = \frac{F}{2} \cdot P_a = \frac{F}{2} \left\{ P_o + p \cdot \sin \frac{2\pi}{L} X \right\}$$

$$\phi_b = \frac{F}{2} \cdot P_b = \frac{F}{2} \left\{ P_o + p \cdot \sin \left( \frac{2\pi}{L} X - \frac{2\pi}{3} \right) \right\}$$

$$\phi_c = \frac{F}{2} \cdot P_c = \frac{F}{2} \left\{ P_o + p \cdot \sin \left( \frac{2\pi}{L} X - \frac{4\pi}{3} \right) \right\}$$

$$\phi_{\bar{a}} = \frac{F}{2} \cdot P_{\bar{a}} = \frac{F}{2} \left\{ P_o - p \cdot \sin \frac{2\pi}{L} X \right\}$$

$$\phi_{\bar{b}} = \frac{F}{2} \cdot P_{\bar{b}} = \frac{F}{2} \left\{ P_o - p \cdot \sin \left( \frac{2\pi}{L} X - \frac{2\pi}{3} \right) \right\}$$

$$\phi_{\bar{c}} = \frac{F}{2} \cdot P_{\bar{c}} = \frac{F}{2} \left\{ P_o - p \cdot \sin \left( \frac{2\pi}{L} X - \frac{4\pi}{3} \right) \right\}$$

The fluxes which intercross with the three separate three phase coils 30A, 30B, and 30C are $\phi_a$ and $\phi_{\bar{a}}$, $\phi_b$ and $\phi_{\bar{b}}$, $\phi_c$ and $\phi_{\bar{c}}$, respectively. The fluxes $\phi_a$ and $\phi_{\bar{a}}$ flow in opposite directions with respect to each other, so that the total flux $\Phi_A$ which intercrosses with the coil 30A is expressed as follows:

$$\phi_A = \phi_a - \phi_{\bar{a}} = F \cdot p \cdot \sin \frac{2\pi}{L} X$$

Similarly, the total fluxes $\Phi_B$ and $\Phi_C$ which intercross with the coils 30B and 30C, respectively are expressed as follows:

$$\phi_B = \phi_b - \phi_{\bar{b}} = F \cdot p \cdot \sin \left( \frac{2\pi}{L} X - \frac{2\pi}{3} \right)$$

-continued $$\phi_C = \phi_c - \phi_{\bar{c}} = F \cdot p \cdot \sin\left(\frac{2\pi}{L} X - \frac{4\pi}{3}\right)$$

As is known from the above expressions, $\Phi_A$, $\Phi_B$, $\Phi_C$ are functions of X, and have a period L of the magnetic teeth, and are sinusoidal functions whose phases differ by 120 degrees from each other. By then exciting each coil of coils 30a, 30b, and 30c in order, the mover 23 can be moved in steps in the longitudinal direction of the stator (the X direction.) If each coil is excited by the three phase sinusoidal currents having phases which differ by 120 degrees from each other, a smoother motion of the mover is possible.

Not shown in the figure, but equipped therewith is a three phase position detector which can detect the magnetic teeth of the stator 21. By exciting each coil of coils 30a, 30b, and 30c in order by switching the currents according to the output signal from this position detector, the mover can be moved like an ordinary brushless DC motor having a permanent magnet.

Modification of this invention is admittable so far as the main points of this invention are not changed. For example, the embodiment shown in FIGS. 2a-2b and 3 are three phase motors, and the three groups of magnetic teeth are formed on both the core 29A and the core 29B, that is to say, six groups of magnetic teeth in all. However, it is also possible to increase the number of groups of magnetic teeth, such as an increase to four or five groups, and to increase the number of coils according to the number of groups of magnetic teeth, thereby fabricating a multiphase system. To make an n-phase system (wherein n is an integer), n groups of magnetic teeth must be formed on an both of the cores 29A and 29B, and n coils must be wound.

In the embodiment of this invention shown in FIGS. 2a-2b and 3, the phase of the teeth of the groups of magnetic teeth formed on the cores 29A and 29B differ by 180 degrees from each other. It is also possible to make them equal in phase, and to form two rows of magnetic teeth on the stator whose phases differ by 180 degrees from each other in the longitudinal direction of the stator.

Figure 5:
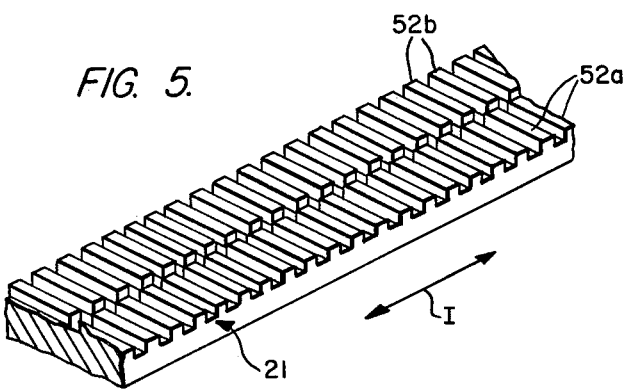
FIG. 5 shows the oblique view of the stator of another embodiment.

FIG. 5 shows another embodiment of the stator of this invention; the embodiment has two rows of magnetic teeth 52a and 52b whose phases differ by 180 degrees from each other as described above, in the longitudinal direction of the stator 21.

As described above, a linear motor of this invention has many excellent effects such that: the permanent magnet of the mover can be long and big since it is set parallel to the longitudinal direction of the stator, so that the weight ratio of the permanent magnet to the mover can be raised. Accordingly, the ratio of driving force to weight is increased and a large acceleration is produced. Furthermore, even in making a multiphase system, the mover size will not be so long in the longitudinal direction of the stator and will be compact and light. Also, if the length of the stator is restricted, this invention is advantageous in the movable distance of the mover.

What is claimed is:

1. A linear motor comprising: a stator along which many magnetic teeth are formed with a constant pitch; a mover which faces said stator across a narrow gap and has the same magnetic teeth as that of the stator; and a mover guiding means which guides the mover smoothly along the stator while maintaining said narrow gap; wherein the mover comprises: a permanent magnet which is long in the longitudinal direction of the stator; two cores which are stacked perpendicularly to the longitudinal direction of the stator with said permanent magnet between them; and a plurality of coils, each of which is wound over said two cores and said permanent magnet and has a magnetization axis which is perpendicular to the longitudinal direction of the stator, wherein each of said two cores has n groups (wherein n is an integer) of magnetic teeth facing the stator, and wherein in each of said n groups of magnet teeth, the pitch of a tooth is constant and is the same as that of the magnetic teeth of the stator, but wherein in each core, the phases of the magnetic teeth of each group are different from each other.

* * * * *